United States Patent
Kanfer et al.

(10) Patent No.: US 11,205,423 B2
(45) Date of Patent: Dec. 21, 2021

(54) RESTROOM MAINTENANCE SYSTEMS HAVING A VOICE ACTIVATED VIRTUAL ASSISTANT

(71) Applicant: GOJO Industries, Inc., Akron, OH (US)

(72) Inventors: Joseph S. Kanfer, Richfield, OH (US); Jackson W. Wegelin, Stow, OH (US); Jason M. Slater, Barberton, OH (US); James F. Dempsey, North Olmsted, OH (US); April Bertram, Canton, OH (US); Sarah E. Kynkor, Copley, OH (US)

(73) Assignee: GOJO Industries, Inc., Akron, OH (US)

(*) Notice: Subject to any disclaimer, the term of this patent is extended or adjusted under 35 U.S.C. 154(b) by 0 days.

(21) Appl. No.: 16/358,142

(22) Filed: Mar. 19, 2019

(65) Prior Publication Data

US 2019/0295548 A1    Sep. 26, 2019

Related U.S. Application Data

(60) Provisional application No. 62/645,464, filed on Mar. 20, 2018.

(51) Int. Cl.
*G10L 21/00* (2013.01)
*G10L 21/06* (2013.01)
(Continued)

(52) U.S. Cl.
CPC .............. *G10L 15/22* (2013.01); *G06Q 10/20* (2013.01); *G07F 9/002* (2020.05); *G10L 15/08* (2013.01);
(Continued)

(58) Field of Classification Search
CPC ........ G06F 3/167; G06F 3/017; G06F 1/3231; A47K 2010/3226; A47K 2010/3668; A47K 5/1217; G05B 2219/2642
See application file for complete search history.

(56) References Cited

U.S. PATENT DOCUMENTS 10,185,921 B1 * 1/2019 Heller ................... G07C 9/27
10,547,498 B1 * 1/2020 Garner, IV ............ H04L 67/303
(Continued)

FOREIGN PATENT DOCUMENTS

WO    2017074406 A1    5/2017

OTHER PUBLICATIONS

International Search Report and Written Opinion from International Application No. PCT/US2019/022974 dated Jun. 3, 2019.
(Continued)

*Primary Examiner* — Olujimi A Adesanya
(74) *Attorney, Agent, or Firm* — Calfee, Halter & Griswold LLP

(57) ABSTRACT

Exemplary embodiments of restroom monitoring systems having a virtual assistants includes a communications gateway located in a restroom. The communications gateway having a processor, memory, short range communications circuitry, long range communications circuitry, a microphone and a speaker. The communications gateway containing logic for listening for a wake up word and upon detecting a wake up word, capturing a request, logic for processing the request to determine what request is being requested, logic for verifying the request with the requester, and one of a plurality of wave files and a voice synthesizer. The system further includes one or more dispensers located in the restroom. The one or more dispensers having short range communications circuitry for communicating status or product level to the communications gateway.

20 Claims, 8 Drawing Sheets

(51) Int. Cl.
*G10L 25/00* (2013.01)
*G10L 15/22* (2006.01)
*G10L 15/08* (2006.01)
*G06Q 10/00* (2012.01)
*G07F 9/00* (2006.01)

(52) U.S. Cl.
CPC .. *G10L 2015/088* (2013.01); *G10L 2015/223* (2013.01)

(56) References Cited

U.S. PATENT DOCUMENTS

| | | | | |
|---|---|---|---|---|
| 2005/0282142 | A1* | 12/2005 | Lynn | G09B 19/0076 434/365 |
| 2009/0119142 | A1 | 5/2009 | Yennit et al. | |
| 2011/0316703 | A1* | 12/2011 | Butler | G08B 21/245 340/573.1 |
| 2012/0154169 | A1* | 6/2012 | Hoekstra | G06Q 10/10 340/870.01 |
| 2017/0372589 | A1 | 12/2017 | Becker et al. | |
| 2019/0086890 | A1* | 3/2019 | Bradley | B05B 1/185 |
| 2019/0087510 | A1* | 3/2019 | Rexach | G06F 16/9035 |
| 2019/0087788 | A1* | 3/2019 | Murphy | G06Q 10/20 |
| 2019/0103103 | A1* | 4/2019 | Ni | G06F 3/167 |
| 2019/0147731 | A1* | 5/2019 | Herdt | G08B 21/24 340/573.1 |
| 2020/0347585 | A1* | 11/2020 | Kim | F24F 11/70 |

OTHER PUBLICATIONS

Anonymous "Speech Synthesis" Wikipeda Sep. 29, 2017 XP055488193, retrieved from https://en.wikipedia.org/w/index.php?title=Speech_sythesis&oldid=8082875014.

Anonymous "Virtual Assistant" Wikipeda Mar. 19, 2018 XP055590896, retrieved from https://en.wikipedia.org/w/index.php?title=Virtual_assistant&oldid=831299144.

\* cited by examiner

RESTROOM MAINTENANCE SYSTEMS HAVING A VOICE ACTIVATED VIRTUAL ASSISTANT

RELATED APPLICATIONS

This application claims priority to and the benefits of U.S. Provisional Patent Application Ser. No. 62/645,464, titled RESTROOM MAINTENANCE SYSTEMS HAVING A VOICE ACTIVATED VIRTUAL ASSISTANT and which was filed on Mar. 20, 2018 and which is incorporated herein by reference in its entirety.

TECHNICAL FIELD

The present invention relates generally to restroom monitoring systems and more particularly to restroom maintenance and monitoring systems having a voice activated virtual assistant.

BACKGROUND OF THE INVENTION

Messy restrooms, empty dispensers, broken dispensers, vandalism and the like are major complaints with respect to building maintenance and cleaning staff. In addition, restrooms that are in disarray are a poor reflection on the tenants and building management, and may lead to a loss business. Prior attempts to address such situations include adding sensors to paper towel dispensers and soap dispensers, adding traffic sensors to monitor volume of users. While these systems may be useful, they have various shortcomings and flaws that result in less than satisfactory systems.

SUMMARY

Exemplary embodiments of restroom monitoring systems having a virtual assistants include a communications gateway located in a restroom. The communications gateways have a processor, memory, short range communications circuitry, long range communications circuitry, a microphone and a speaker. The communications gateway contain logic for listening for a wake up word and upon detecting a wake up word, capturing a request, logic for processing the request to determine what request is being requested, optionally logic for verifying the request with the requester, and may have one of a plurality of wave files and a voice synthesizer. The system further includes one or more dispensers located in the restroom. The one or more dispensers having short range communications circuitry for communicating status or product level to the communications gateway.

Another exemplary restroom monitoring system having a virtual assistant includes a communications gateway located in a restroom. The communications gateway has a processor, memory, short range communications circuitry, long range communications circuitry, a microphone and a speaker. The communications gateway includes logic for listening for a wake up word, logic for capturing a request, logic for processing the request to determine what request is being requested, logic for verifying the request with the requester; one or more wave files and a voice synthesizer. In addition, the system includes one or more dispensers located in the restroom. The one or more dispensers have short range communications circuitry for communicating status or product level to the communications gateway. The system further includes a master station containing communications circuitry for receiving one or more requests from the communications gateway.

Another exemplary restroom monitoring system having a virtual assistant includes a communications gateway located in a restroom, the communications gateway has a processor, memory, short range communications circuitry, long range communications circuitry, a microphone and a speaker. The communications gateway contains logic for listening for a wake up word, logic for capturing a request, logic for processing the request to determine what request is being requested, logic for verifying the request with the requester, one or more wave files and a voice synthesizer. The system further includes a master station having a processor, memory, a display and communications circuitry.

Another exemplary restroom monitoring system having a virtual assistant includes a communications gateway located in a restroom. The communications gateway includes a processor, memory, short range communications circuitry, long range communications circuitry, a microphone and a speaker. The communications gateway includes logic for listening for a wake up word and upon detecting a wake up word, capturing a request, logic for processing the request to determine what request is being requested, logic for verifying the request with the requester, one of a plurality of wave files and a voice synthesizer. The system includes a master station having a processor, memory, a display and communications circuitry; and one or more remote terminals for receiving instructions to perform one of maintenance, refilling products or cleaning.

BRIEF DESCRIPTION OF THE DRAWINGS

These and other features and advantages of the present invention will become better understood with regard to the following description and accompanying drawings in which.

DETAILED DESCRIPTION

Figure 1:
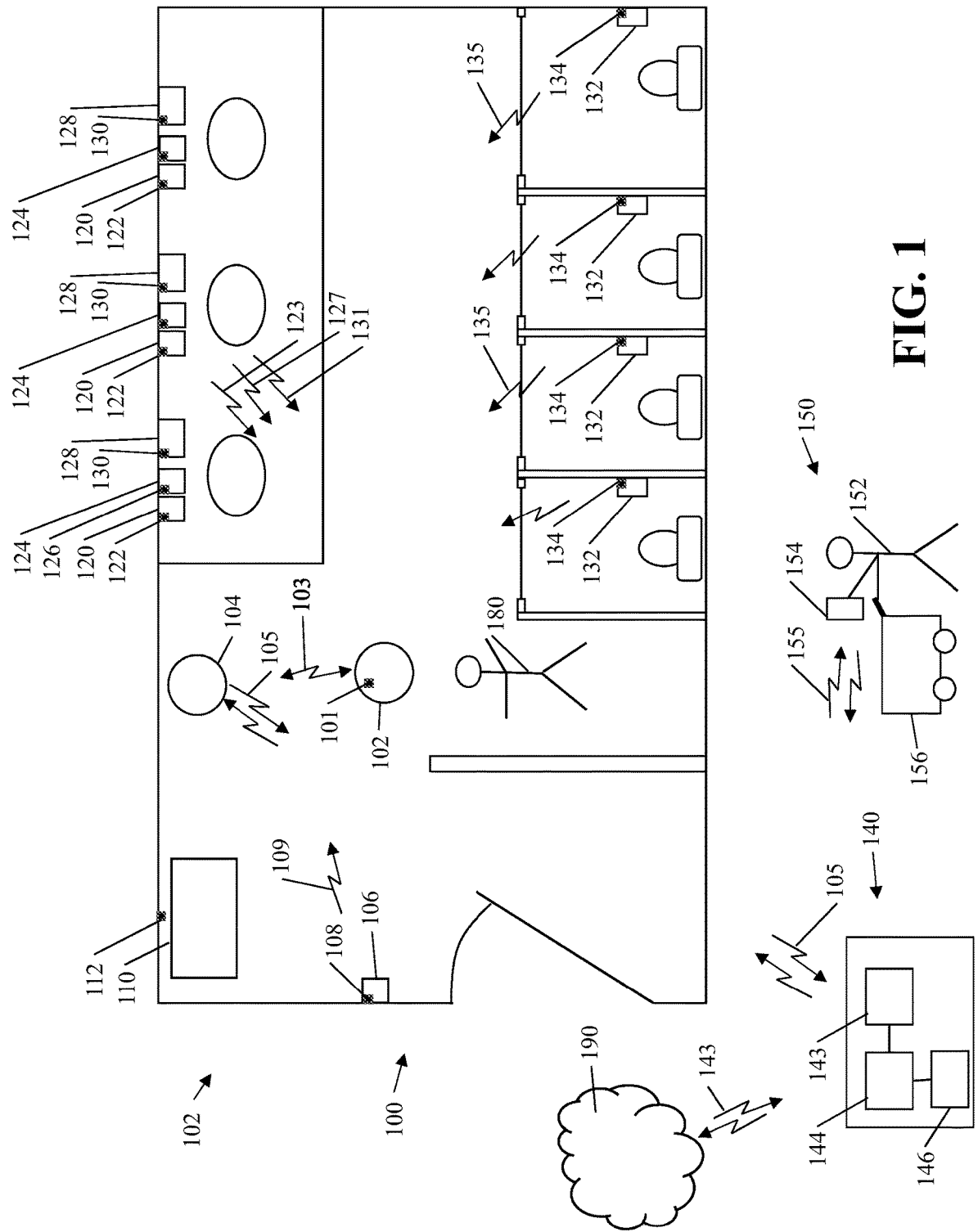
FIG. 1 is a schematic diagram of an exemplary embodiment of a restroom maintenance system having a voice activated virtual assistant.

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication. Circuit communication includes providing power to one or more devices. For example, a processor may be in circuit communication with one or more batteries, indicating that the batteries provide power to the processor.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, power signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, people counter based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

Any values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

FIG. 1 illustrates an exemplary embodiment of an inventive restroom maintenance system having a voice activated virtual assistant 100. The exemplary system 100 includes a restroom 102. Restroom 102, as described herein, includes sensors that indicate fill level or product depletion on all of the dispensers or consumable products. In some embodiments, the dispensers also contain circuitry or sensors that monitor dispenser functionality, e.g. low battery, stalled motor, blocked outlet and the like. In the event that there is an issue with dispenser functionality, that information may be passed along in similar manners as the other data discussed herein. In some embodiments, only some of the dispensers or consumable products have sensors that indicate fill level or product depletion. In some embodiments, data received from one or more dispensers may be used to predict depletion of product or product level on one or more dispensers that do not have sensors to determine product levels or dispenser functionality.

In this exemplary embodiment, restroom 102 includes: an optional people counter 102 that may have a transmitter or transceiver 101 associated therewith; a communications gateway 104; a plurality of soap dispensers 122 that may have transmitters or transceivers 122 associated therewith; a plurality of lotion dispensers 124 that may have transmitters or transceivers 126 associated therewith; a plurality of paper towel dispensers 128 that may have transmitters or transceivers 130 associated therewith; a plurality of toilet paper dispensers 1232 that may have transmitters or transceivers 134 associated therewith; a waste receptacle 110 that may have a transmitter or transceiver 112 associated therewith; and one or more sanitizer dispensers 106 that may have transmitters or transceivers 108 associated therewith.

The exemplary system 100 includes a master station 140 for receiving data from people communications gateway 104. In some embodiments, multiple master stations 140, or nodes, are provided and some or all of the data is transmitted to one or more of the nodes. In some embodiments the system 100 includes one or more remote terminals 154, which may be, for example, a personal data accessory, such as, for example, a tablet or smart phone, or a laptop or desktop computer. In addition, in some embodiments, the exemplary system 100 includes cloud based speech recognition software 180.

People counter 102 may be used to determine the presence of one or more people in the restroom 102. People counter 102 includes a sensor (not shown) to detect the presence of people as they enter and/or exit the restroom. The sensor may be an active sensor and/or a passive sensor. Exemplary embodiments of people counters are shown and described in co-pending U.S. Non-Provisional application Ser. No. 16/274,597, which is titled Modular People Counters and which was filed on Feb. 13, 2019 and which is incorporated herein by reference in its entirety. People counter 102 may transmit signal 103 through transceiver or transmitter 101 to communications gateway 104 that a person or persons have entered into the restroom or have left the restroom. In some embodiments, communications gateway 104 may determine a person's (generally a person wearing a badge, or that has an app on their smart phone, or other electronic device) proximity to the communications gateway 104 by signal strength. In some embodiments, people counter 102 also serves as a proximity sensor for communications gateway 104 to indicate to communications gateway 104 that a person or patron 180 is located proximate communications gateway 104 and is likely trying to communicate with communications gateway 104. In some embodiments, if patron 180 is not indicated as being proximate communications gateway 104, communications gateway 104 may ignore any words or commands from patron 180. In this exemplary embodiment, communications gateway 104 includes a speaker (not shown) and a microphone (not shown) for communicating with the patron.

Sanitizing dispenser 106, soap dispensers 120 and lotion dispensers 128 may be any type of dispensers such as, for example, touch-free dispensers or manual dispensers. Exemplary touch-fee dispensers are shown and described in U.S. Pat. No. 7,837,066 titled Electronically Keyed Dispensing System And Related Methods Utilizing Near Field Response; U.S. Pat. No. 9,172,266 title Power Systems For Touch-Free Dispensers and Refill Units Containing a Power Source; U.S. Pat. No. 7,909,209 titled Apparatus for Hands-Free Dispensing of a Measured Quantity of Material; U.S. Pat. No. 7,611,030 titled Apparatus for Hands-Free Dispensing of a Measured Quantity of Material; U.S. Pat. No. 7,621,426 titled Electronically Keyed Dispensing Systems and Related Methods Utilizing Near Field Response; and U.S. Pat. No. 8,960,498 titled Touch-Free Dispenser with Single Cell Operation and Battery Banking; all which are incorporated herein by reference.

Paper towel dispensers 128 may be any type of paper towel dispenser, such as for example, roll dispensers, folded paper towel dispensers and the like. Similarly, toilet paper dispensers may be any type of toilet paper dispenser.

The exemplary dispensers 106, 120, 124, 128, 132 may optionally have a level sensor built into the dispenser or added to the dispenser. Any type of level sensor may be used, such as, for example, ultrasonic sensors, weight sensors, mechanical sensors, infrared sensors, and the like. In some embodiments, all of the types of dispensers have level sensors. In some embodiments, one or more of the types of dispensers have level sensors. In some embodiments, two or more of the types of dispensers have level sensors. In some embodiments, three or more of the types of dispensers have level sensors. In some embodiments, for example, soap dispensers 120 have level sensors 122 and toilet paper dispensers 132 have level sensors 134. In some embodiments, the level of soap in soap dispenser 120 may be used to estimate the level of paper towels in paper towel dispenser 128. For example, if a user washes her hands, one can assume the user used a selected amount of paper towels to dry her hands and that she threw the paper towels in the trash can. For example, it may be determined that for each hand wash, a patron uses two paper towels. Thus, for each dispense of soap, the paper towel level is lowered by two sheets. Similarly, assuming the patron deposits the used paper towels in the trash can, the level of fill of the trashcan may be estimated as a function of the amount of soap dispensed. Similarly, waste receptacles 110 may have level sensors 112 that indicate the volume of waste in the waste receptacle 110. In some embodiments, only some of each type of the dispensers have level sensors. For example, in some embodiments, if there are three sinks, only one soap dispenser may contain a level sensor. In some embodiments, a level of one product may be indicative of the level of another, for example, the level of paper towels may be fairly proportional to the level of waste in the waste receptacle.

In addition to level sensors, the exemplary dispensers 106, 120, 124, 128, and 132 may include a processor and circuitry that is able to self-diagnose the dispenser. For example the soap, lotion and sanitizer dispensers 120, 128, and 106 may include circuitry that detects dispenser functionality such as problems or malfunctions, such as, for example, a plugged pump, a defective pump, low battery, a stalled motor, a malfunctioning actuator or the like. The processor and circuitry may communicate such dispenser functionality to their respective communications modules for transmission.

The exemplary dispensers 106, 120, 124, 128, and 132 and waste receptacles 110 that have level sensors may also have transmitters/transceivers 108, 122, 126, 130, 134, 112 respectively. The transmitters/transceivers 108, 120, 126, 130, 134, and 112, may be transceivers (not shown) so that the transmitters/transceivers may send and receive signals, however, in some embodiments the transmitters/transceivers 108, 120, 126, 130, 134, and 112, are transmitters and can transmit signals only.

Preferably, transmitters/transceivers 108, 120, 126, 130, 134, and 112 utilize short range communications protocols. Exemplary short range communications protocols include, for example, Bluetooth, Zigbee, Wi-Fi, infrared, and the like. Communication modules 108, 120, 126, 130, 134, and 112 transmit product or waste levels, problems, or malfunctions to signals 101, 109, 123, 127, 131, and 135 to communication gateway 104. Use of short range communications protocols may extend battery life on the dispensers.

Figure 2:
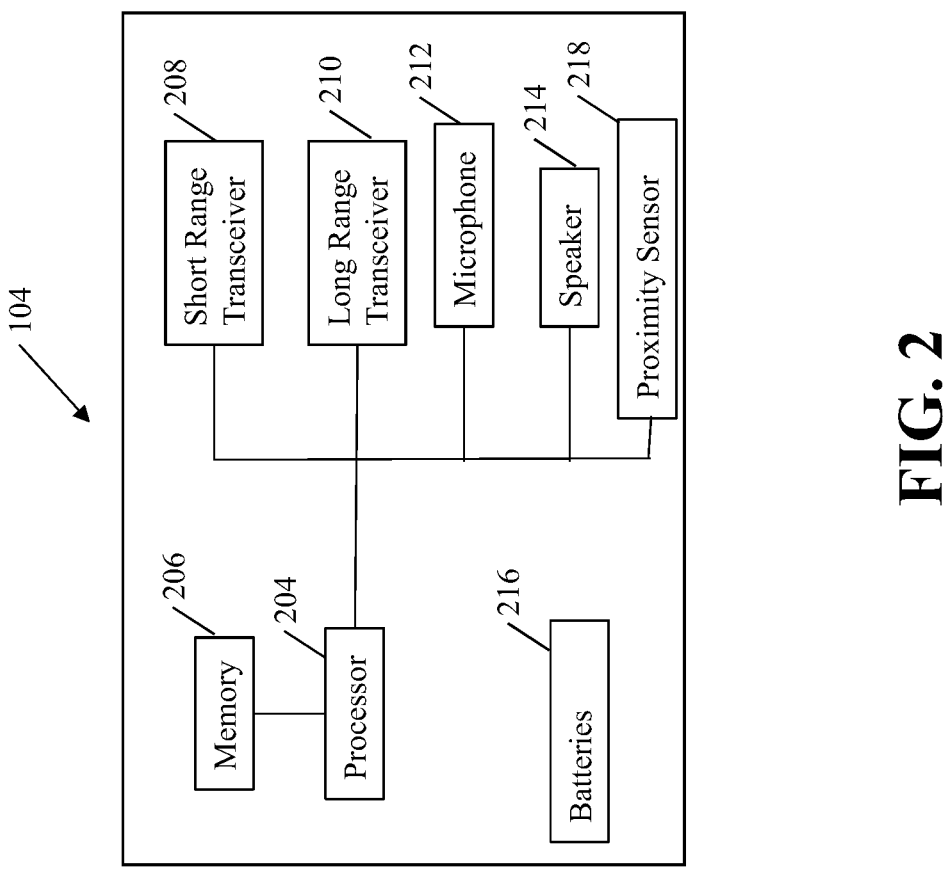
FIG. 2 is a schematic diagram of an exemplary embodiment of a communications gateway.
Figure 3:
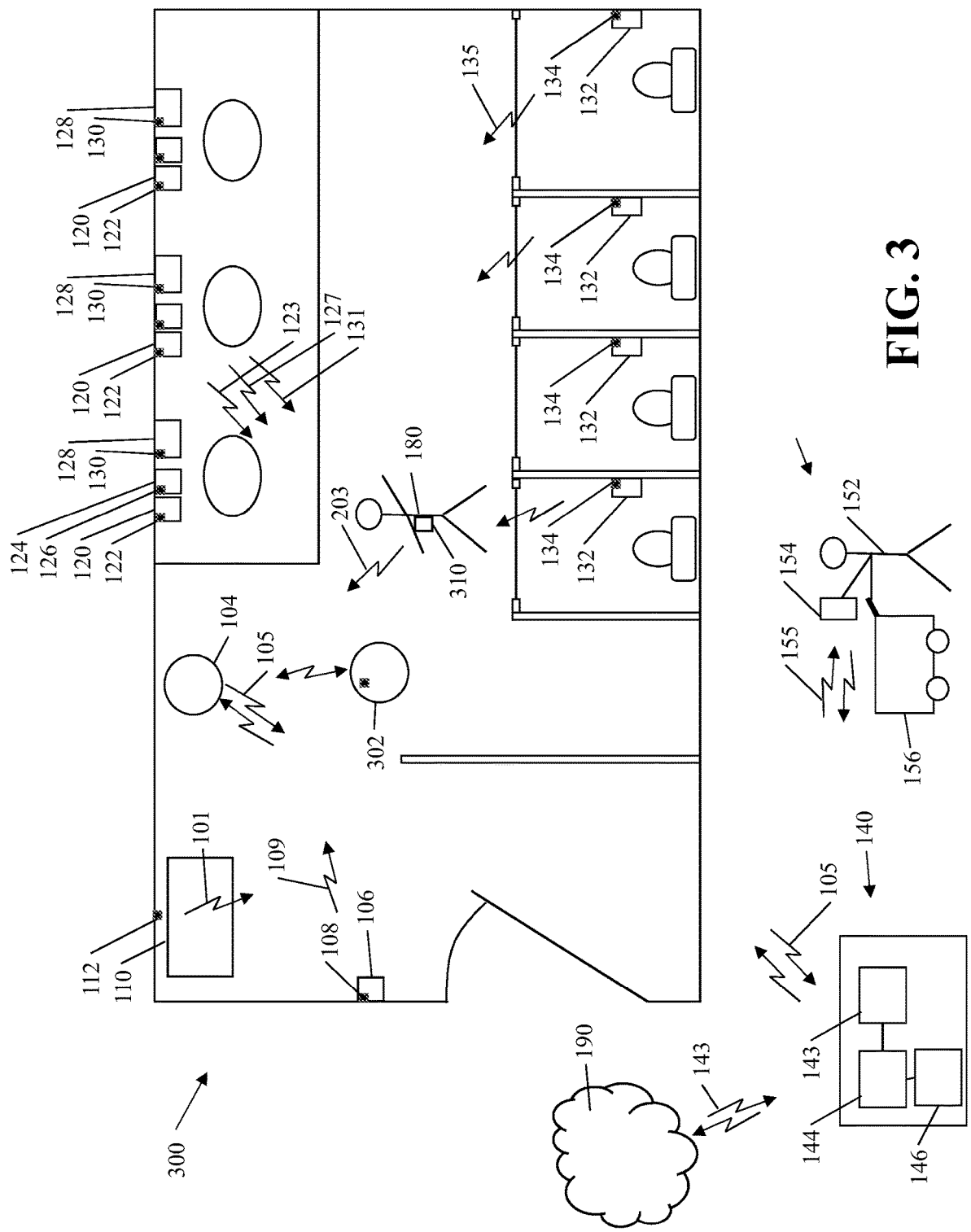
FIG. 3 is a schematic diagram of another exemplary embodiment of a restroom maintenance system having a voice activated virtual assistant.

As can be seen from FIG. 2, communications gateway 104 includes a processor 204, memory 206, a short range transceiver 208 for communicating with transmitters/transceivers 108, 120, 126, 130, 134, and 112. Communications gateway 104 also includes a long range transceiver 210 for communicating with master station 140. In some embodiments, communications gateway 104 includes cellular circuitry (not shown) and can transmit and receive signals 105 via cellular technology, which may replace transceiver 210 or be in addition to transceiver 210. In some embodiments communications gateway 104 includes a modem (not shown) and can transmit and receive signals 105 through the modem, which may replace transceiver 210 or be in addition to transceiver 210. In some embodiments communications gateway 104 includes an Ethernet connector (not shown) and can transmit and receive signals 105 via the Ethernet cable, which may replace transceiver 210 or be in addition to transceiver 210. In addition, communications gateway 104 includes a microphone 112 and a speaker 114. All of which are in circuit communications with memory 204. Communications gateway 104 includes a power source 116, such as for example, one or more batteries. In some embodiments, communications gateway 104 may include a proximity sensor 218. Proximity sensor 218 may be used to determine if a person making a request is within proximity of the communications gateway 104, which is the virtual assistant. This allows communications gateway 104 to ignore conversations and background noises and only listen for commands directed to the virtual assistant. In some embodiments, various components of the communications gateway 104 described herein are separate from the others. For example, the speaker 114 and microphone 112 may be separated from the communications circuitry.

In addition to receiving signals 101, 109, 123, 127, 131, and 103, communications gateway 104 may receive verbal commands from a person 180 through microphone and 212. Communications gateway 104 may also respond or transmit natural language to the person 180 through speaker 214. In some embodiments, the transmitted natural language is a voice synthesizer. In some embodiments, the transmitted natural language is from a wave file. In some embodiments, the natural language is generated by a virtual talking robot "Bot", such as a learning Bot. In some embodiments, the natural language is gender based or age based. In one exemplary embodiment, the restroom 102 is a woman's restroom and the natural language may be a female voice. In one exemplary embodiment, the restroom 102 is a men's restroom and the natural language may be a male voice. In another exemplary embodiment, the restroom is a student's restroom and the natural language may be the same gender and similar age as the student.

As discussed in more detail below, communications gateway 104 listens for certain command words, such as for example, "wake-up", "Lou", "out of soap" "out of toilet paper", "out of paper towels", "mess", etc. In some embodiments, when communications gateway 104 hears these wake-up words, communications gateway 104 records the language surrounding the wake-up words and transmits the language as a signal 105 master station 140. In some embodiments, communications gateway 104 provides feedback to the patron 180. In some embodiments, the feedbacks in the form of a question, such as, for example, "I think I heard you say you're out of toilet paper." Is this correct? And then communications gateway 104 listens for response such as for example, "yes" or "no". If the answer is yes, communications gateway 104 sends a signal 103 indicating that a stall is out of toilet paper. If the patron 180 responds no, communications gateway 104 may ask the person 180 to repeat the commands. The signals 105 are received by master station 140 which processes communications. In some embodiments, the master station 140 outputs signals 155 to remote terminal 154 which may be assigned to for example, a maintenance worker or cleaning staff 152 who has a cleaning cart or repair cart 156.

Master station 140 includes a transceiver 143 processor 144 and display 146. As described above with respect to communications gateway 104, master station 140 may include a modem (not shown), an Ethernet connection (not shown), or the like for communicating with communications gateway 104. In some embodiments, master station 140 also includes logic for receiving signals 105 and determining what commands to send to remote terminal 154. In some embodiments master station 140 sends natural language captured by communications gateway 104 as signals 143 to verbal recognition software in cloud 190. The verbal recognition software in cloud 190 transmits signals 143 back to master station 140 with the natural language translated into text for processing.

In some embodiments if the person responds "no", master station 140 transmits the natural language in the form of signals 143 to verbal recognition software located in the cloud 190 and receives back signals 143 of the translated language in a text format and the master station send signals 105 back to communications gateway 104 indicative of what person 180 requested. In some embodiments, communications gateway 104 may verify the request with the person 180. These and other embodiments are described in more detail below.

In some exemplary embodiments, system 100 includes the ability to provide instructions or work requests the maintenance staff or the cleaning staff to provide maintenance, fill one or more dispensers with its product, empty waste receptacles, clean the restroom or the like, or contact security. In some embodiments, the instructions or work requests are delivered to a remote terminal 154, which may be, for example, a personal data accessory, such as, for example, a tablet or smart phone, or a laptop or desktop computer. Each department may have different remote terminals 154. Accordingly, master station 140 may direct appropriate signals to the appropriate departments. In some embodiments, different individuals have different remote terminals 154, and master station may determine whether the selected individual is currently working or not, whether the selected individual has the bandwidth to handle the request, and the like.

System 300 is similar to system 100 however, people counter 302 includes circuitry for detecting a badge 310 on person 180. The system 300 is capable of identifying who person 180 is based on unique information stored on the badge 310 that the person is wearing. People counter 302 transmits a unique identifier of badge 310 to communications gateway 104 which may be transmitted to master station 140. Accordingly, the follow-up message may be communicated to person 180 wearing badge 310 informing them that the service they have requested has been completed or work order has been placed.

In some embodiments, the person wearing the badge 310 is a maintenance worker or cleaning staff 152. In such embodiments, communications module 104 may determine whether the person wearing the badge 310 has completed the maintenance request, the cleaning request, and/or refill of products request. In some embodiments, the time the person wearing the badge 310 spends in the restroom may be tracked with time stamps. Such information may be used, for example, to determine whether a maintenance worker or cleaning staff was in the restroom for a period of time that is sufficient to handle the request that has been submitted to that person. In some embodiments, the time stamps may be used to determine the last time the restroom was cleaned or maintained. In some embodiments, communications gateway 104 transmits signals 105 indicative of such events to master station 140 and the events are logged and time stamped.

In some embodiments, communications gateway 104 may be used to warn patrons 180 when they enter the restroom. For example, if a water spill has been reported when people counter 302 determines a person has entered the restroom, communications gateway 104 may provide an alert to the patron 182 watch for water on the floor. Additional exemplary warnings may take the form of please don't use stall three it's out of toilet paper, or please don't use sink two because it is out of soap. In some embodiments, communications gateway 104 includes a display (not shown) to display information to patrons 180. Accordingly, communications gateway 104 may communicate audibly or visually. In some embodiments, the display (not shown) alerts the patron what requests have already been made.

The exemplary methodologies and logic described herein are not meant to be limiting. Additional blocks may be included, some blocks may be deleted, and the blocks may be performed in different orders than shown. The exemplary methodologies, or portions thereof, may be combined. Various portions of the logic described herein may be in one or more of the local devices, e.g. the communications gateway 104 or one or more of the dispenser components, or a stand alone component. Various portions of the logic described herein may be performed in the master station, or another computing device, or in the cloud.

Figure 4:
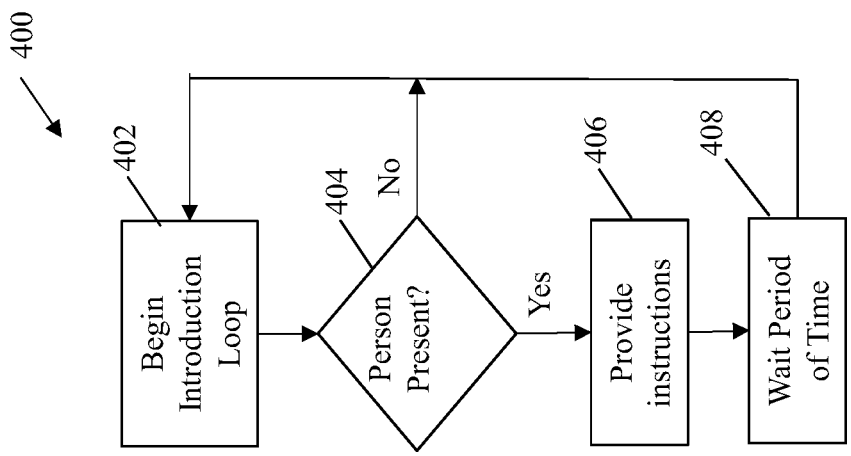
FIG. 4 is an exemplary logic diagram for informing patrons of the existence of the virtual assistant.

FIG. 4 is an exemplary logic diagram 400 for informing patrons of the existence of the virtual assistant. Exemplary methodology, begins at block 402. At block 404, the logic determines whether a person is present. If no person is present logic loops back up to the introduction loop at block 402. If a person is present, the logic provides instructions to the person. These instructions may include, for example, natural language and/or visual display. The instructions may state, for example, hello my name is Lou. I'm your virtual assistant. I'm here to help. If you need assistance please say "wake up," or "Lou", or "I need help." If I don't hear these words, I will not listen. After I'm woken up, I can recognize commands like this restroom is a mess please clean it, stall one is out of toilet paper, there's no soap in the soap dispensers, out of paper towels, the trashcan is overflowing, there's water on the floor, the toilet is blocked, and the like. In some embodiments, the methodology proceeds block 408 and waits a selected period of time before looping back to block 402.

Figure 5:
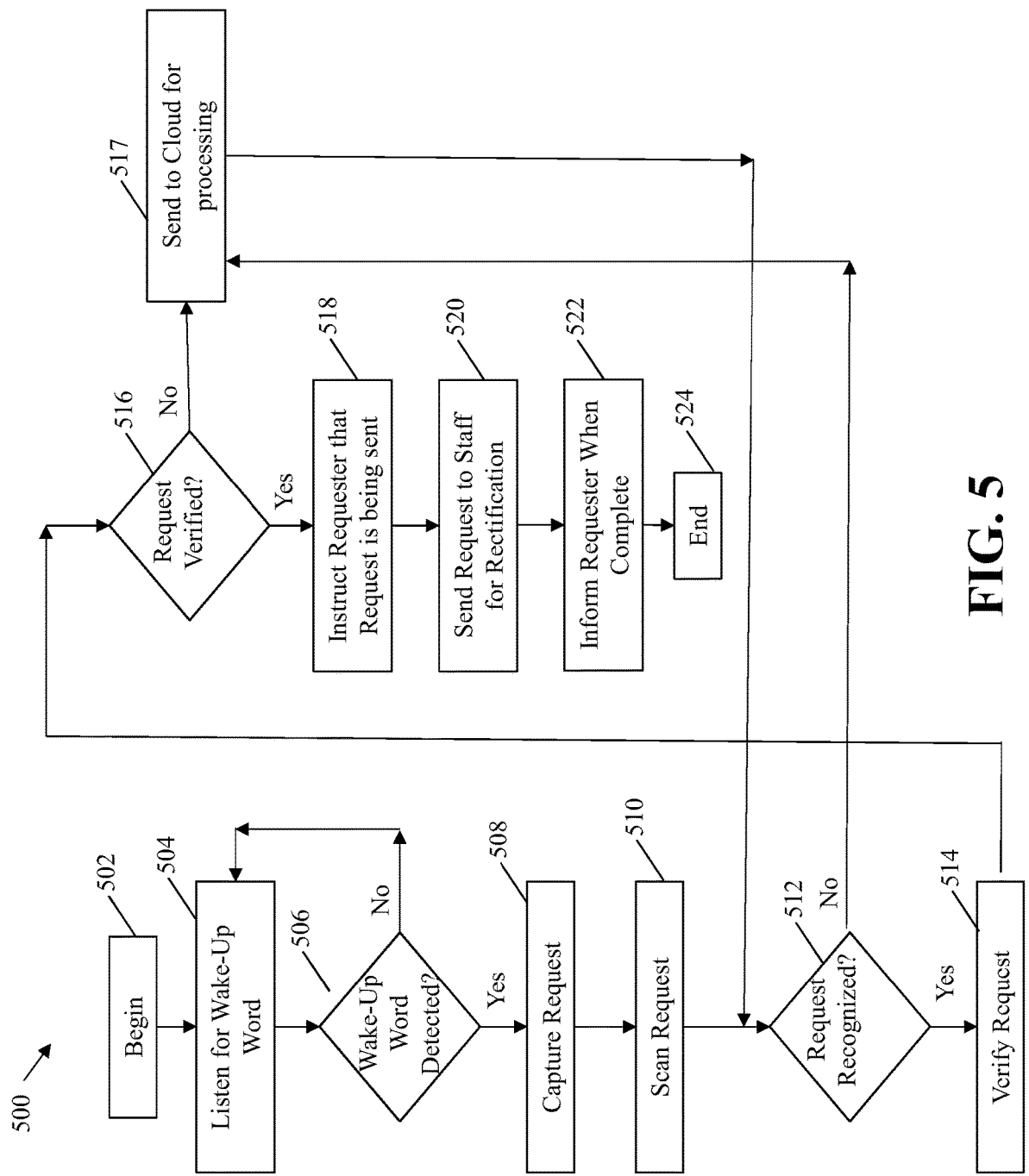
FIG. 5 is an exemplary logic diagram for the virtual assistant to provide assistance.

FIG. 5 is an exemplary logic diagram 500 for the virtual assistant to provide assistance in facilitating the needs of the patron. The logic begins at block 502 and at block 504 the virtual assistant listens for a wake-up word. At block 506 a determination is made as to whether the wake-up word was detected. If no wake-up word was detected the logic loops back to block 504. If a wake-up word was detected, the logic proceeds to block 508 and captures a request that follows the wake-up word. In some embodiments, the logic continually records and buffers a selected length of sound so that the logic may capture request or portions of requests that occurred prior to the wake-up word.

At block 510 the request is scanned and determination is made whether the request is recognized a block 512. This initial recognition preferably takes place locally, e.g. in the communications gateway. At block 514 the request is verified with the requester, i.e. the communications gateway may ask the person who requested the service if the request is correct. For example, the virtual assistant may say "I think I heard you say were out of paper towels, is that correct?" At block 516 a determination is made of whether the request was verified. If the requester responds that is the correct request, the virtual assistant may instruct the requester that the request has been sent to the appropriate person at block 518. At block 520 the request is sent to one or more of a master station, the appropriate maintenance worker, cleaning staff, security or the like. In some embodiments, if the virtual assistant knows who the requester was, a follow-up message may be sent to the requester informing them that the request has been logged and/or completed. The logic ends at block 524.

If at block 516 the request is not verified, the natural language may be sent to the master station or the cloud for processing at block 517 and the translated text is sent back the communications gateway. The methodology loops back to block 512 to determine whether the request is now recognized and flows through the system to verify the request as described above. If the request is still not recognized at block 512, the request may be resent to for processing at block 517, or it may be sent to the master station and/or stored in a database and/or referred to a human for interpretation. If the request is still not what the patron requested, the patron may be informed that the request was not understood but will be forward to a person for interpretation. Accordingly, the logic of methodology 500 may be performed locally, remotely or a combination of both.

Figure 6:
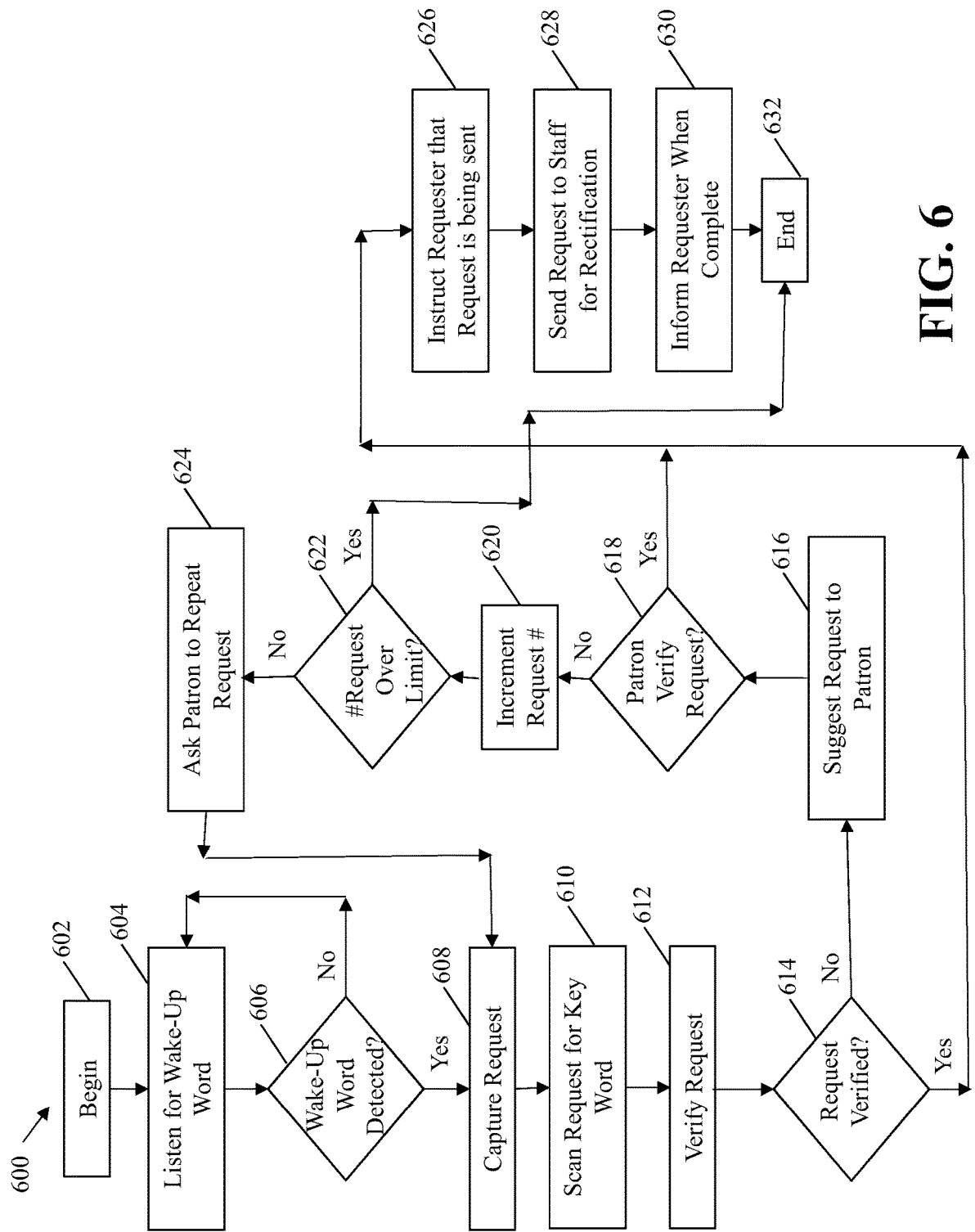
FIG. 6 is another exemplary logic diagram for the virtual assistant to provide assistance.

FIG. 6 is another exemplary logic diagram 600 for the virtual assistant to provide assistance in facilitating the needs of the patron. The exemplary methodology begins at block 602 and at block 604 the virtual assistant listens for a wake-up word. If no wake-up words detected the methodology loops back to block 604. If a wake-up words detected at block 606 the methodology flows to block 608 and the request that follows the wake-up word is captured. As described above, the system may buffer a selected period of time so that an portion of the request that predates the wake-up word may be recognized. The captured request is scanned for keywords at block 610. At block 612 the virtual assistant verifies the request with the requester by, for example, informing the user that "I think you requested this particular service, is that correct?" In some embodiments, if the request is verified at block 614 the exemplary methodology flows to block 626 and the virtual assistant instructs the requester that the request is being processed. At block 628 the request is submitted to the appropriate department or staff for rectification. In some embodiments, the request is stored for later use. In some embodiments, when the request is complete the requester is informed that the request is completed and the methodology ends at block 632

If at block 614 the request is not verified, the virtual assistant suggests a request to the patron, such as, for example, "did you mean this selected request?" The exemplary methodology loops to block 618 where a determination is made as to whether the patron verifies the suggested request. If the patron verifies the suggested request, the methodology flows to block 626. If the patron does not verify the request, a count number is incremented a block 620. At block 622 a comparison is made to determine if the number of requests is over a certain count limit. If the request is over the selected count limit such as, for example, five suggestions have been made, the methodology flows to block 632 and ends. In some embodiments, the virtual assistant will store the natural language of the requester for later processing.

If at block 622 it is determined that the request number is not over the selected limit the virtual assistant asked the patron to repeat the request at block 624 and the methodology flows to block 608. This exemplary methodology allows the virtual assistant to operate in a local mode without the need to connect to the cloud for use of voice recognition software located therein. Accordingly, if the Internet access is lost or the connectivity is not good at that particular time, the virtual assistant still may help the patron fill her request by obtaining the request and transmitting the request when the data may be transmitted to the master station. Because the system may store the requests, the request may be processed after internet access is restored. In some embodiments, the data is transmitted to the master station through an application on a smart device. In some embodiments, when a person having the application on their device passes within a certain distance from the virtual assistant, the data is automatically passed through the device to the master station.

Figure 7:
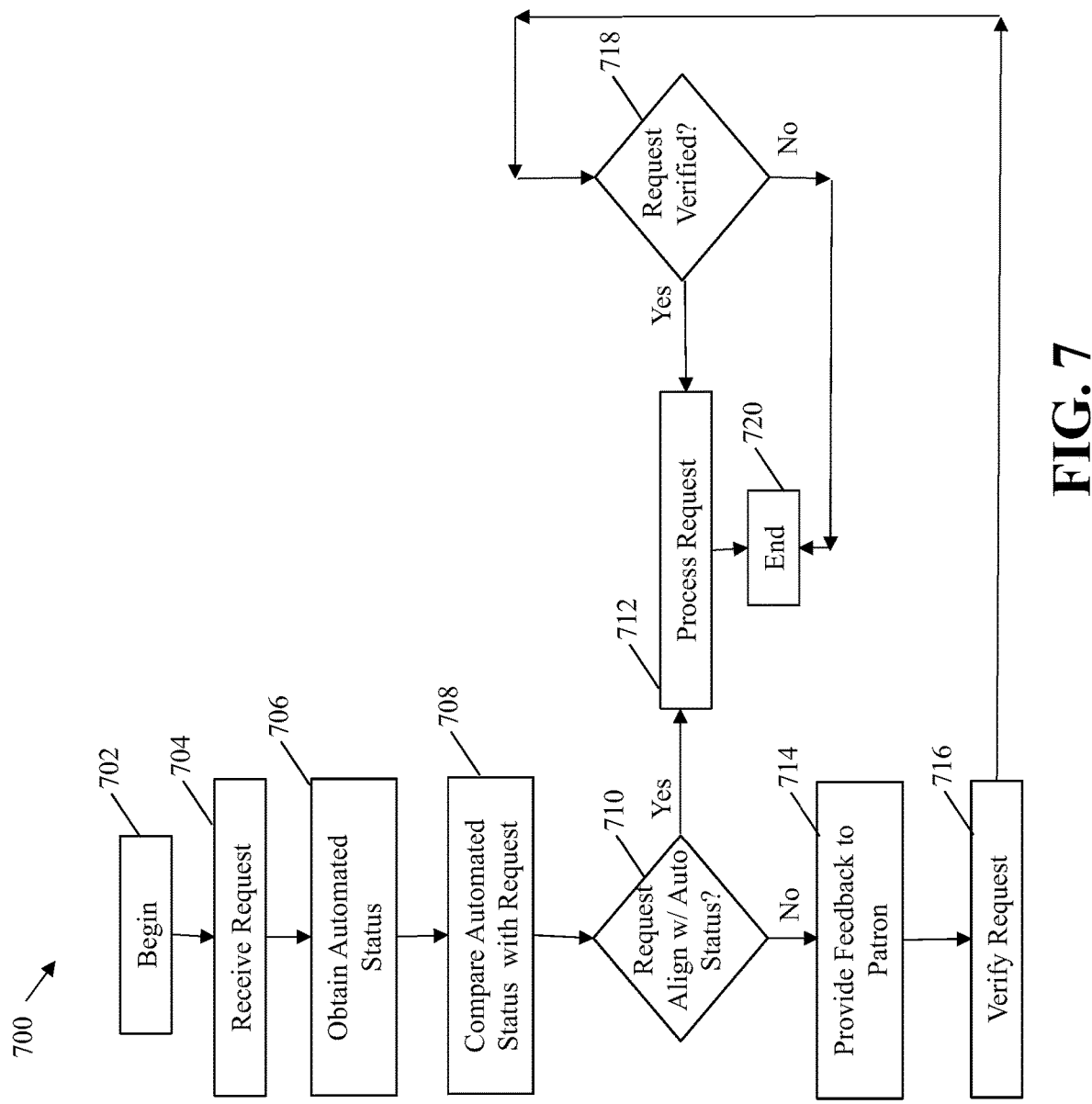
FIG. 7 is another exemplary logic diagram for the virtual assistant to provide assistance.

FIG. 7 is another exemplary logic diagram 700 for the virtual assistant to provide assistance in facilitating the needs of the patron. The exemplary methodology shown in logic diagram 700 is used to help verify that requester is not providing false information or creating unnecessary work. The methodology begins at block 702. At block 704 the virtual assistant receives a request from the patron. At block 706, automated statuses of the device that the patron is requesting a service for is obtained and reviewed. For example, if the requester indicates that dispenser number one is out of soap, the methodology looks to see what the level sensor associated with soap dispenser one indicates the status to be of the soap dispenser to be. In some embodiments, dispenser functionality is also reviewed. At block 708, the request is compared with the automated status of the device, such as level and functionality. At block 710 determination is made whether the request aligns with the automated status. If the determination is made at block 710 that the request is aligned with the automated status, the request is processed at block 712 and the methodology ends at block 720. If at block 710 it is determined that the request does not align with the automated status, feedback is provided to the patron at block 714 and the patron is asked to verify her request at block 716. At block 718 a determination is made whether the request is verified and if request is verified, request is processed at block 712. If the request is not verified the methodology ends at block 720. Optionally if the request is not verified at block 718 the methodology may loop back up to block 704 and a request that the requester re-request the service.

Figure 8:
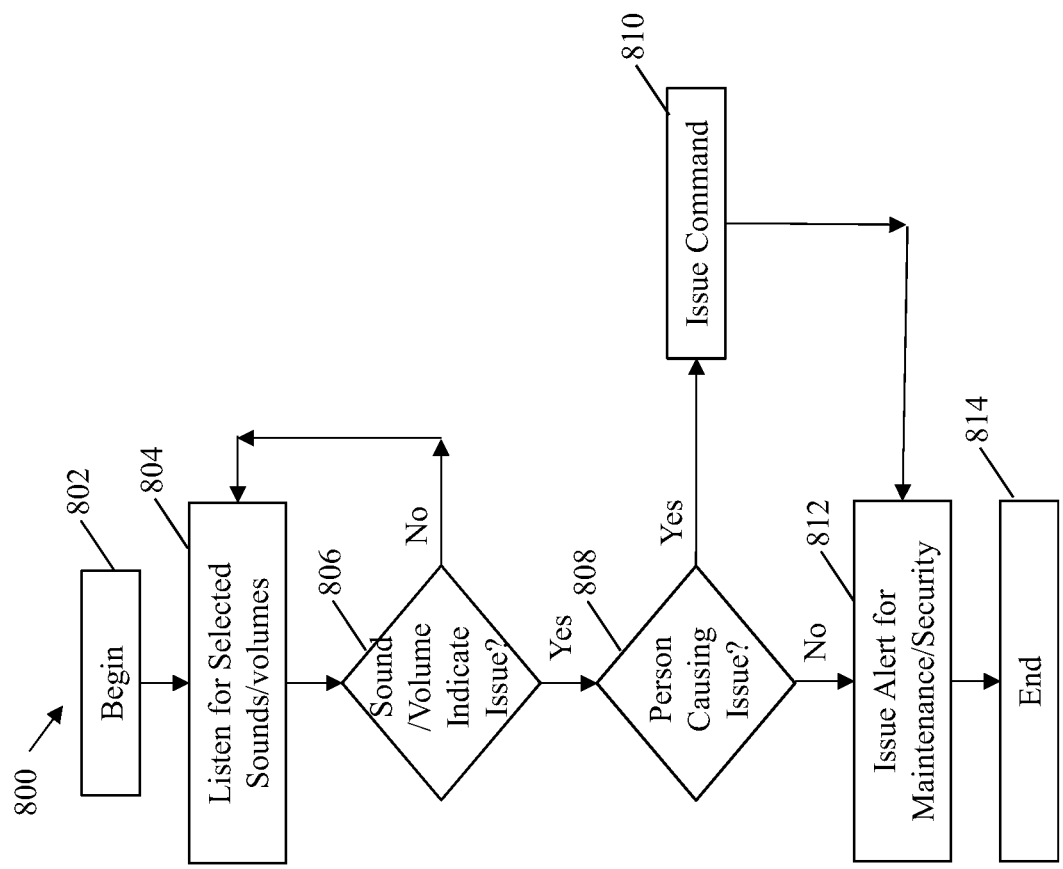
FIG. 8 is another exemplary logic diagram for the virtual assistant to provide assistance.

FIG. 8 is another exemplary logic diagram 800 for the virtual assistant to provide assistance in facilitating the needs of the patron. The exemplary methodology shown in logic diagram 800 may be used to detect vandalism, such as, for example, breaking glass, or other maintenance issues, such as, for example, excessive water flow, excessive flushes, excessive dispenses, and the like. The exemplary methodology begins at block 802 and at block 804 the virtual assistant listens for selected sounds or volumes of sounds. If at block 806 a determination is made that the sound or volume does not indicate an issue, the methodology loops back to block 804. If at block 806 a determination is made that the sound or the volume of the sound indicates an issue, a determination is made at block 808 as to whether a person is causing the issue. If a person is causing the issue of block 808, the virtual assistant issues a command at block 810 informing the person to cease causing the issue. If at block 808 a determination is made that a person is not cause an issue, and/or after the virtual assistant issues the command to the person, an alert is sent to maintenance or security to take care of the issue and the methodology ends at block 814.

In some embodiments, upon hearing selected sounds such as dispensers being activated or the toilets flushing, the virtual assistant may determine whether or not a person is present. If no person is present, the dispenser being activated or the toilets are being flushed, the virtual assistant may inform the maintenance department that the problem with the valves or sensors causing waste of water and/or product.

In some embodiments, the communications gateway broadcasts announcements, such as, for example, weather reports, reminders to sanitize one's hands during flu season, safety alerts, and the like.

In some embodiments, the communications gateway monitors for key "safety concern" words. For example, in some embodiments, such as, for example, in school restrooms, the communications gateway may monitor for words like "gun," "bomb", "Columbine", "shooting" and the like. When the communications gateway recognizes key safety concern words, the communications gateway records the conversation and transmits the conversation in natural language to a master station. In this embodiment, the master station may be in the principal's office or at a local police station. The natural language may be reviewed by appointed staff and a determination may be made as to whether the conversation raises a safety concern.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. It is not the intention of the applicant to restrict or in any way limit the scope of the appended claims to such detail. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order in which the steps are presented to be construed as required or necessary unless expressly so stated.

We claim:

1. A restroom monitoring system having a virtual assistant comprising:
    a communications gateway located in a restroom;
    the communications gateway having
        a processor,
        memory,
        short range communications circuitry,
        long range communications circuitry,
        a microphone and
        a speaker;
    the communications gateway containing
        logic for listening for a wake up word and upon detecting a wake up word,
        logic for capturing a service request for a service that needs to be performed in a restroom;
        logic for processing the service request for a service that needs to be performed in a restroom to determine what service is being requested;
        logic for verifying the service request with the requester to ensure that the virtual assistant has identified the correct service that needs to be performed; and
        one of a plurality of wave files and a voice synthesizer;
        wherein the one of a plurality of wave files and a voice synthesizer is used to provide verbal communications to a user that initiates a service request; and
    one or more dispensers located in the restroom;
    the one or more dispensers having short range communications circuitry for communicating status or product level to the communications gateway.

2. The system of claim 1 further comprising a master station comprising communication circuitry for receiving signals from and providing signals to the communications gateway.

3. The system of claim 2 further comprising logic for providing one or more signals to a remote terminal, wherein the remote terminal provides instructions to complete a request.

4. The system of claim 1 further comprising a people counter for determining whether a person has entered the room.

5. The system of claim 4 wherein the people counter includes communications circuitry for detecting a unique identifier identifying a person.

6. The system of claim 5 wherein the unique identifier is a badge.

7. The system of claim 1 wherein the communications gateway further comprises a proximity sensor for determining a person is located proximate to the communications gateway and is likely trying to communicate with the communications gateway.

8. The system of claim 1 wherein the communications gateway further comprises a display.

9. The system of claim 1 further comprising a soap dispenser.

10. The system of claim 1 further comprising a hand sanitizer dispenser.

11. The system of claim 1 further comprising logic for providing a greeting to inform a user of the virtual assistant.

12. The system of claim 1 further comprising logic for detecting a wake up word and for receiving a request.

13. The system of claim 12 wherein the service request is one of a maintenance request, a cleaning request and a product refill request.

14. The system of claim 12 further comprising logic for scanning the service request and for selecting a stored service request that closest aligns to the service request.

15. The system of claim 14 further comprising logic for verifying that the stored service request is what the requester requested.

16. The system of claim 1 further comprising logic for comparing the service request with automated data electronically collected from a dispenser.

17. The system of claim 1 further comprising logic for determining whether a sound is indicative of vandalism.

18. The system of claim 1 further comprising logic for determining whether a sound is indicative of dispenses occurring when there is not a person in the restroom.

19. A restroom monitoring system having a virtual assistant comprising:
- a communications gateway located in a restroom;
- the communications gateway having
- a processor,
- memory,
- short range communications circuitry,
- long range communications circuitry,
- a microphone and
- a speaker;
- the communications gateway containing
  - logic for listening for a wake up word and upon detecting a wake up word,
  - logic for capturing a service request for a service that needs to be performed in a restroom;
  - logic for processing the service request for a service that needs to be performed in a restroom to determine what service is being requested;
  - logic for verifying the service request with the requester to ensure that the virtual assistant has identified the correct service that needs to be performed; and
  - one of a plurality of wave files and a voice synthesizer;
- wherein the one of a plurality of wave files and a voice synthesizer is used to provide verbal communications to a user that initiates a service request; and
- one or more dispensers located in the restroom;
- the one or more dispensers having short range communications circuitry for communicating status or product level to the communications gateway;
- a master station containing communications circuitry for receiving one or more requests from the communications gateway.

20. A restroom monitoring system having a virtual assistant comprising:
- a communications gateway located in a restroom;
- the communications gateway having a processor,
- memory,
- short range communications circuitry,
- long range communications circuitry,
- a microphone and
- a speaker;
- the communications gateway containing
  - logic for listening for a wake up word and upon detecting a wake up word,
  - capturing a service request for a service that needs to be performed in a restroom;
  - logic for processing the service request for a service that needs to be performed in a restroom to determine what service is being requested;
  - logic for verifying the service request with the requester to ensure that the virtual assistant has identified the correct service that needs to be performed; and
  - one of a plurality of wave files and a voice synthesizer;
- wherein the one of a plurality of wave files and a voice synthesizer is used to provide verbal communications to a user that initiates a service request; and
- a master station having a processor, memory, a display and communications circuitry; and
- one or more remote terminals for receiving instructions to perform one of maintenance, refilling products or cleaning.

* * * * *